[15] 3,682,245

Argabright et al.

[45] Aug. 8, 1972

[54] SELECTIVE PLUGGING OF MORE PERMEABLE ZONES

[72] Inventors: Perry A. Argabright, Sedalia, Colo. 80135; C. Travis Presley, Littleton, Colo. 80120

[73] Assignee: Marathon Oil Company, Findlay, Ohio

[22] Filed: Sept. 15, 1970

[21] Appl. No.: 72,388

[52] U.S. Cl. ................. 166/270, 166/271, 166/274, 166/294, 166/281
[51] Int. Cl. .................... C07d 55/38, E21b 33/138, E21b 43/22
[58] Field of Search .................... 166/268–270, 274, 166/275, 292–295, 281, 300, 282, 283; 260/77.5 NC

[56] References Cited

UNITED STATES PATENTS

| | | | |
|---|---|---|---|
| 3,044,548 | 7/1962 | Perry et al. | 166/295 X |
| 2,541,688 | 2/1951 | Cardwell | 166/295 |
| 2,786,530 | 3/1957 | Maly | 166/295 |
| 2,858,892 | 11/1958 | Carpenter | 166/295 |
| 2,867,278 | 1/1959 | Mallory et al. | 166/295 |
| 3,181,611 | 5/1965 | Dollarhide | 166/295 |
| 3,244,230 | 4/1966 | Sharp | 166/292 |
| 3,573,259 | 3/1971 | Argabright et al. | 260/77.5 NC |

*Primary Examiner*—Stephen J. Novosad
*Attorney*—Joseph C. Herring and Richard C. Willson, Jr.

[57] ABSTRACT

More permeable zones in subterranean formations in fluid communication with a well can be partially or completely plugged by injecting solutions of compounds which precipitate over a period of time, e.g., aqueous solutions of isocyanuric acid and its substituted derivatives, so as to decrease the permeability to a controlled extent. This permits secondary recovery of oil-in-place without excessive flow of displacing fluids through the originally more permeable zone.

9 Claims, 4 Drawing Figures

INVENTORS
P.A. ARGABRIGHT
C.T. PRESLEY

ATTORNEY

SELECTIVE PLUGGING OF MORE PERMEABLE ZONES

CROSS REFERENCES TO RELATED APPLICATIONS

The following U. S. Pat. No. relate to the general field of the invention: Ser. No. 89,883 filed Nov. 16, 1970, Ser. No. 72,288 filed Sept. 15, 1970, Ser. No. 111,422 filed Feb. 1, 1971, Ser. No. 715,199 filed Mar. 22, 1968, now U.S. Pat. No. 3,573,259, Ser. No. 872,380 filed Oct. 29, 1969, now U.S. Pat. No. 3,625,964, Ser. No. 715,182 filed Mar. 22, 1968, now abandoned, and Ser. No. 682,576 filed Nov. 14, 1967, now U.S. Pat. No. 3,549,630.

BACKGROUND OF THE INVENTION

1. Field of the Invention

The present invention relates to the field of petroleum recovery as classified in Class 166 of the U.S. Patent Office entitled "Wells," particularly in subclasses −285 ("Cementing, plugging or consolidating"), −294 ("Cement or consolidating material is organic..."), −295 ("Organic material - resinous"), and −306 ("Fluid enters and leaves well at spaced zones").

2. Description of the Prior Art

Various processes have been utilized for plugging and sealing subterranean formations, including those of U. S. Pat. No. 2,800,184 which temporarily plugs oil-bearing strata with specific surface active materials, then permanently plugs more permeable strata with cement or other permanent plugging agent, then removes the temporary plug and recovers oil; U. S. Pat. No. 2,889,883 which seals porous underground formations with aromatic polyisocyanates or urethane derivatives, a specific catalytic phenol and an organic solvent which form an infusible resin in from 20 minutes to about 24 hours; U. S. Pat. No. 3,199,590 which consolidates incompetent sands with curable consolidating fluids, e.g., furfuryl alcohol and derived resins, then introducing an oil-overflush solution immiscible with the consolidating fluid and containing a quantity of catalysts for curing the consolidating fluid in the formation; U. S. Pat. No. 3,116,264 which teaches cementing compositions of water, hydraulic cement and maleic anhydride-vinyl nitrogen-containing ring compound copolymer as a slurry for cementing wells; U. S. Pat. No. 3,181,612 which utilizes a particularly dry water-soluble polyurethane polymer injected into the formation at fracturing pressure where it contacts intruding water which causes it to swell. Other plugging agents include thermo setting resins, gums, silica gel, etc. Less related is U.S. Pat. No. 2,899,330 which stabilizes soil with alkenyl polyamines.

SUMMARY

General Statement of the Invention

None of the aforementioned literature teaches a controlled rate of precipitation of compounds from water solutions with the advantage of controlled permeability reduction.

The present invention offers new methods for increasing the efficiency of secondary recovery operations conducted in formations having "thief" zones of high permeability. In secondary recovery operations (and even some primary recovery operations), such permeable zones can cause oil-in-place in less permeable zones to be bypassed by the displacing fluids. The present invention offers new methods for reducing the permeability of such thief zones to alleviate such bypassing.

Especially important is the degree of control which the present invention permits both in the placement of the mass of precipitated material and in the degree of reduction of permeability.

The present invention permits controlled timing of precipitation over a period of from a few minutes to many days allowing for ease of placement of the plugging solution into the formation at the points desired. The present invention can reduce high permeability formation to a permeability of less than one millidarcy. According to the invention, aqueous solutions of molecules containing isocyanurate rings, more preferably containing isocyanuric acid groups and their derivatives, are adjusted in concentration and in pH so as to provide the desired rate of precipitation in view of the temperature prevailing in the formation and other factors. These materials then precipitate, plugging the formation. Importantly, it is possible by adjusting concentration and/or by moving the solutions of the invention through the formation during the precipitation phase to cause partial plugging of the formation without completely blocking the formation.

Utility of the Invention

The present invention is useful in alleviating the problems encountered in stratified oil-bearing formations. The invention can be applied to formations which have one or more relatively high permeability zones, whether or not such zones are oil-bearing, together with at least one lower permeability oil-bearing zone in which both types of zones communicate with the well. The more permeable zones can either be substantially or completely blocked off, e.g. by positioning a mass of the solution of the invention at the point where the more permeable zone communicates either with the less permeable zone or with the well and causes sufficient precipitation to substantially reduce or eliminate permeability. Alternatively, the present invention can be used to reduce permeability of the more permeable zone so that all of the zones in a stratified formation can be brought to approximately the same permeability, permitting recovery operations to proceed under substantially improved injectivity profiles. As is well recognized in the art, reducing the permeability, $k$, desirably decreases the mobility of M of subsequently injected drive fluids in the treated portions of the reservoir. The invention can also be used as a temporary or permanent plugging agent to prevent pressure loss during conventional fracturing operation or to direct conventional acid treating solutions to desired strata.

BRIEF DESCRIPTION OF THE DRAWINGS

The FIGS. are a schematic representations of the application of the invention to preferred stratified petroleum-bearing formations having three zones of varying permeability, as described in the Examples.

DESCRIPTION OF THE PREFERRED EMBODIMENTS

Starting Materials

Figure 1:
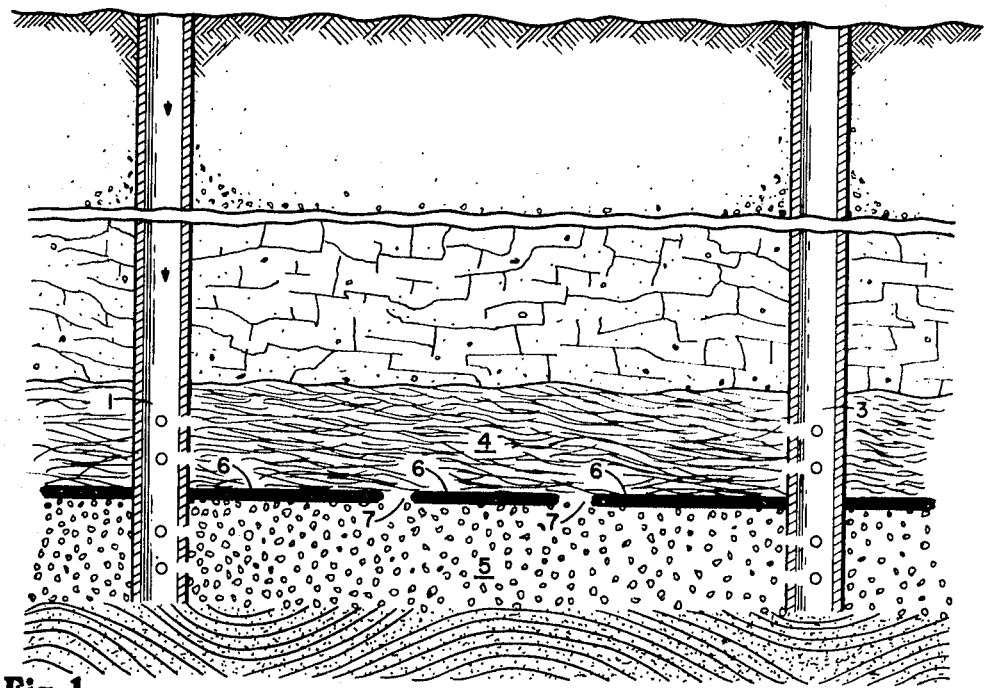

The plugging materials for use in the present invention are water-soluble materials, preferably compounds containing isocyanurate rings which gradually react to form precipitates, preferably aqueous solutions of compounds containing isocyanuric acid rings or their derivatives and most preferably polyisocyanurate compounds having the structure:

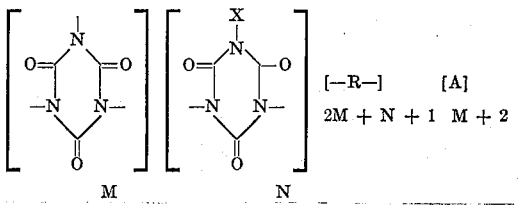

where
R = divalent radical
x = a metal (e.g. Na, K, Li) or hydrogen, quaternary ammonium, or a combination thereof
A = a monovalent group selected from the following: isocyanate, urethane ($NHCO_2R'$), urea, amino
R' = monovalent radical
M = average number of trisubstituted isocyanurate rings
N = average number of isocyanuric acid and/or isocyanurate salt groups
2M + N + 1 = average of divalent R groups
M + 2 = average number of A groups
wherein R preferably contains two to 40, more preferably two to 30, and most preferably four to 18 carbon atoms; R' preferably contains one to 40, more preferably one to 20, and most preferably one to 10 and wherein there are no N-to-N bonds and no A-to-N bonds, and no A-to-A bonds, and no R-to-R bonds.

Preferably the plugging agents will be present in the aqueous solutions in concentrations of about 0.01 to about 85, more preferably 0.10 to 50, and most preferably 0.25 to 25 weight percent. The viscosity of the aqueous solutions will be low enough to be injectable and will preferably be in the range of from about 0.1 to about 500, more preferably from about 0.25 to about 100, and most preferably from 0.50 to about 50 centipoises. While not necessary to the practice of the present invention, auxiliary agents, e.g., flocculating agents, other salts, polyacrylamides or other polymers or other thickening agents may be added to the aqueous solutions if desired for the particular applications.

The preferred isocyanurate ring-containing compounds can be produced according to the methods of Canadian Pat. No. 831,994 granted Jan. 13, 1970 to Argabright, DePuy and Phillips. The most preferred polyisocyanuric acid derivatives having the structure drawn above can be prepared according to the techniques of West German application No. 1,816,521 which is a counterpart of copending U.S. Pat. application Ser. No. 715,199 filed Mar. 22, 1968, now U.S. Pat. No. 3,573,259.

The water used to form the aqueous solutions of the present invention can be fresh water or saline waters.

pH Control

In utilizing the preferred isocyanuric acids and derivatives, the precipitation occurs by a controlled hydrolysis of these compounds to form water-insoluble precipitates. The desired degree of plugging of the pores of the formation and the placement of the plugged zone within the desired portion of the reservoir, are accomplished by controlling the rate both of precipitation and amount of precipitate. This rate of hydrolysis is related to the pH of the solution at the time of injection. Having selected the rate of injection and the concentration, and knowing the temperature in the zone to be plugged, the optimum pH can be chosen by routine laboratory runs. In general, the higher the pH, the faster the hydrolysis and subsequent precipitation. In general, the pH will be in the range of from about four to about 15, more preferably from about six to 15, and most preferably from about eight to about 15 with the exact pH of the injection being selected so as to cause precipitation at the rate desired under the particular circumstances.

Pumping Time

By "pumping time" is meant the time required to move the aqueous solution into place and fill the portion of the reservoir which is to be partially or completely plugged. This pumping time can be readily calculated from the desired rate to be treated of injection, the distance from the wellbore to the portion of the formation and the volume of that portion.

In most instances, it will be desirable to initially inject the solution at a maximum rate until the solution fills the portion of the formation to be plugged. If that portion is to be completely plugged, the solution should be rapidly injected until it fills the portion and injection then stopped for a time sufficient to permit sufficient precipitation to completely plug that portion. This technique can also be used with lower concentration solutions of the invention to permit partial reduction of permeability.

However, if the permeability of a very large volume is to be reduced but not eliminated, the injection should be controlled so that the aqueous solution contacts each pore of the volume for a time sufficient to permit precipitation from the solution to fill the pore to the desired degree. Thus where the permeability of large volumes is to be reduced without completely blocking, the injection of the fluids will preferably proceed at a controlled rate once the solution reaches that portion of the formation which is to be reduced in permeability.

In general, pumping times will preferably range from about 0.1 to about 10,000, more preferably from 1.0 to about 1,000, and most preferably from two to about 200 hours. Where partial plugging is desired, average contact time in each pore will preferably range from about 0.1 to about 10,000, more preferably from 1.0 to about 1,000, and most preferably from two to about 200 hours, depending, of course, on the rate at which the aqueous solution is hydrolyzing and forming precipitates.

In most cases it will be preferable to keep the initial rapid injection sufficiently slow so as to avoid fracturing of the formation but fracturing may be desirable under specialized circumstances. Fracturing of the zone which is to be reduced in permeability will, in most instances, be carefully avoided. However, the invention may be applied to more permeable zones to prevent loss of pressure in conventional fracturing operations.

Formation Permeability

In general, the permeability of the formation before treatment will range from about 0.001 to about 30,000, more preferably from 0.5, to about 10,000, and most preferably from 0.2 to about 5,000 millidarcies. After treatment, the permeability may range from 0.0001 to about 25,000, more commonly from 500 to about 0.01 or may be reduced to zero.

Placement Techniques

A wide variety of techniques, including those previously employed with conventional plugging agents, may be utilized to place the aqueous solutions of the present invention into the portion of the formation which is to be plugged.

Where desirable, injection may initially be at above fracturing pressures so that the flow moves rapidly through the fractured formation toward the zone which is to be plugged. Variable-elevation packers may be utilized to inject the aqueous solution into a particularly porous strata which is to be reduced in permeability.

The present invention has the advantage of an inherent "leveling" effect. In initially introducing the aqueous solution into the formation, it will tend to flow first into zones having the highest permeability, then into less permeable zones and, in most cases, will not penetrate the least permeable zones. Therefore, the highest degree of precipitation (and the highest degree of reduction in permeability) will tend to automatically occur in the zones which most need permeability reduction.

In other variations of the invention, the concentration of the aqueous solutions can be varied as each successive zone is flooded with the solution, using conventional movable packers to direct the flow.

EXAMPLE I

Preparation of Polyisocyanurate Salt

A 2000 ml four-necked glass reactor equipped with a motor driven stirrer, reflux condenser, thermometer and adapter for introducing liquid is charged with 43.3 g of potassium cyanate (0.53 mole) and 1000 ml of anhydrous dimethylformamide (DMF). To the resulting slurry at 75° C., 71 ml of tolylene diisocyanate (0.50 mole) is added dropwise at a rate of 0.428 ml/min. by means of a motor-driven syringe pump. After the addition was complete, the mixture was allowed to react an additional 10 min., cooled to 60° C., 100 ml of methanol added and the temperature permitted to drop to 23° C. The desired product was collected by filtration of the crude reaction mixture, extracted with acetone in a Soxhlet apparatus and dried to give 130.4 g of a pale yellow powder.

The product is water-soluble but relatively insoluble in hydrocarbon solvents.

The ratio of aromatic rings to end groups:

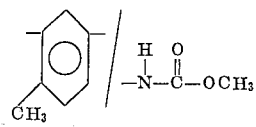

was measured by N.M.R. (in $D_2O$) to be 12.8. This corresponds to a minimum average molecular weight of 6500.

EXAMPLE II

A sample of fired Berea sandstone having a cylindrical shape 3 inches in diameter and 2 feet in length is chosen as a model porous medium. Two differential pressure taps are installed in the core. One pressure tap is placed near the entrance end of the porous medium (pressure tap A); the other is located near the center (pressure tap B). The initial permeability to the flow of 1.8 percent NaCl solution is determined as the average of the permeability values obtained at selected flow rates. An initial permeability of 144 md is measured at pressure tap, whereas B yields a permeability of 119 md.

At this point a 3 percent aqueous solution of the isocyanurate salt produced in Example I (pH within the most preferred range) is injected into the core, displacing the NaCl solution. The total amount of this fluid injected is approximately 1.2 pore volumes. This fluid is then allowed to remain in the core for roughly 40 hours. After this time the permeability of the core is redetermined with 1.8 percent NaCl solution.

| $\kappa$initial | $\kappa$final | ($\kappa$final/$\kappa$initial) | Pressure Tap |
|---|---|---|---|
| 144 md | 1.6 md | 0.011 | A |
| 119 md | 1.2 md | 0.010 | B |

EXAMPLE III

In FIG. 1, an injection well 1, and a production well 3, each penetrate a reservoir comprising two zones, zone 4 is a relatively oil-rich zone having a relatively low permeability. Zone 5 is a substantially "wateredout" zone which contains primarily water and which is approximately ten times as permeable as zone 4. The reservoir was previously water flooded and zone 5, being more permeable, permitted more water to flow through displacing most of the oil from zone 5 and rendering it still more permeable because of the increased water saturation. Shale "breaks" 6, i.e., thin layers of shale, separate most portions of zone 4 from zone 5, but these shale breaks are interrupted by holidays 7, which permit limited communication between zones 4 and 5.

Attempts at further water flooding merely cause flow of water through more permeable zone 5, leaving the oil-in-place in zone 4 substantially undisplaced.

Figure 2:
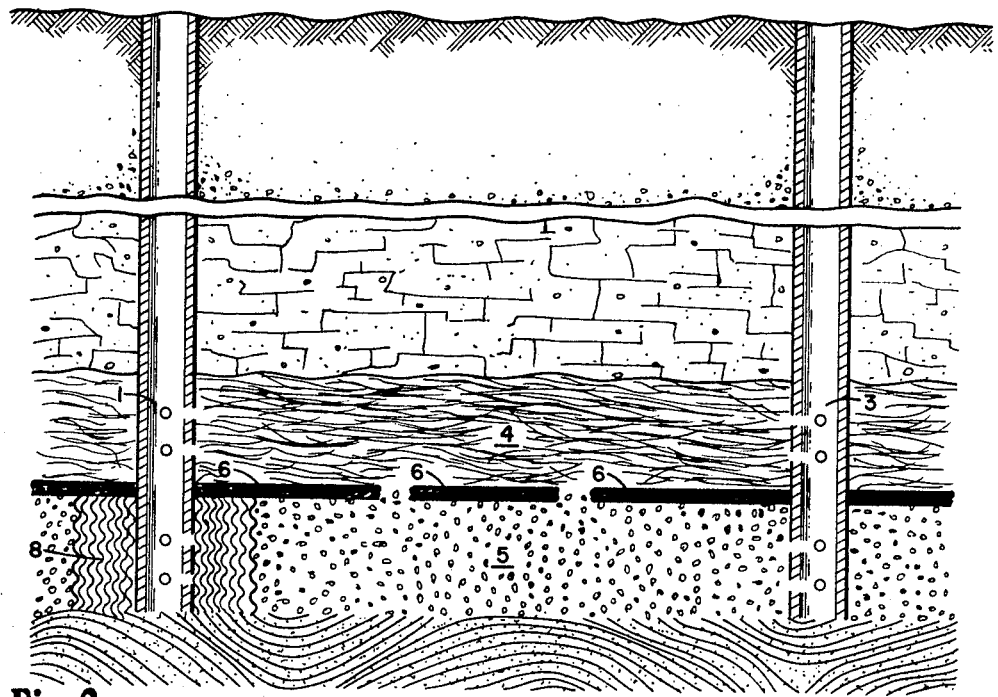
Figure 3:
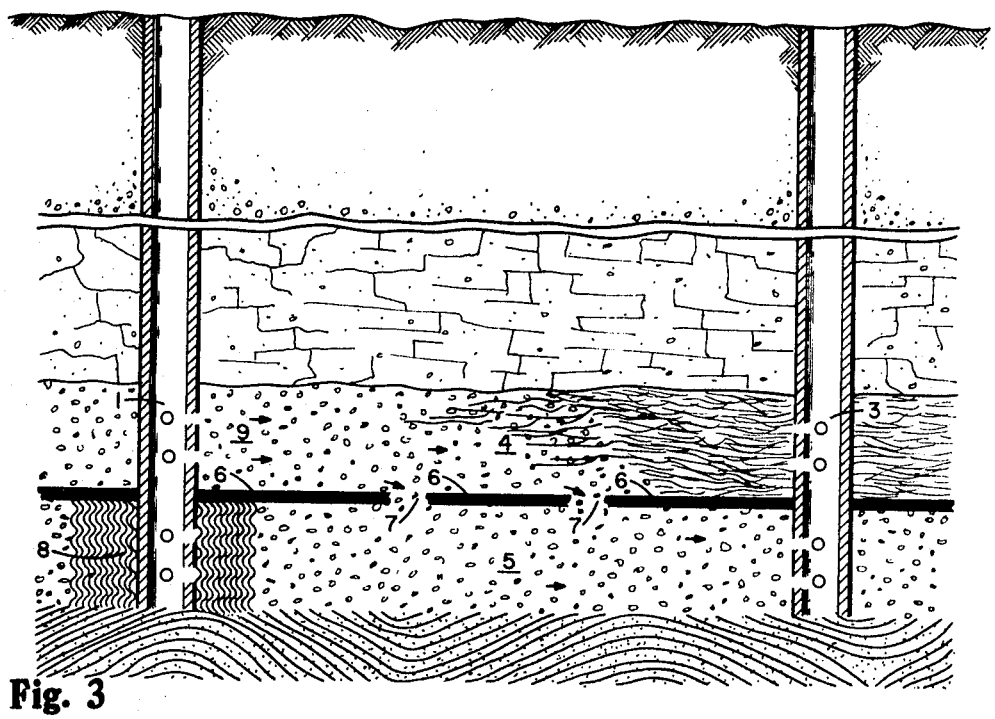

In FIG. 2, treatment of zone 5 according to the present invention, is accomplished by injecting aqueous solutions of isoxyanurate salts of the type formed in Example I of the present application. While a movable packer could be used to prevent flow of the aqueous solution into zone 4 and to direct the flow instead into zone 5, because of the much greater permeability of zone 5 this is not necessary in the present case since substantially all of the aqueous solution preferentially flows into the more permeable zone 5. The injected aqueous solution forms a mass 8 around injection well 1. After the desired volume within the formation has been filled with the aqueous solution, the solution is allowed to stand in place within the formation for approximately 48 hours during which precipitation occurs. The materials which precipitate from the aqueous solution have the general type of chemical structure shown in FIG. 3 of U.S. Pat. Ser. No. 72,288, filed Sept. 15, 1970. At the end of the aforementioned 48 hour period, the precipitation has reduced the permeability of zone 8 to level below that of zone 4.

When drive water is injected into the formation through injection well 1, the presence of mass 8 substantially blocks flow of drive water into zone 5 and the drive water instead, flows into zone 4 displacing oil-in-place toward production well 3. Oil-in-place is swept from zone 9, shown in FIG. 3 and the drive water then encounters holidays 7, causing severe communication problems and permitting the drive water to gradually escape from zone 4 into more permeable zone 5. The invention may, in turn, then be used to plug such holidays, or alternate techniques may be substituted as discussed in Example IV below.

EXAMPLE IV

Figure 4:
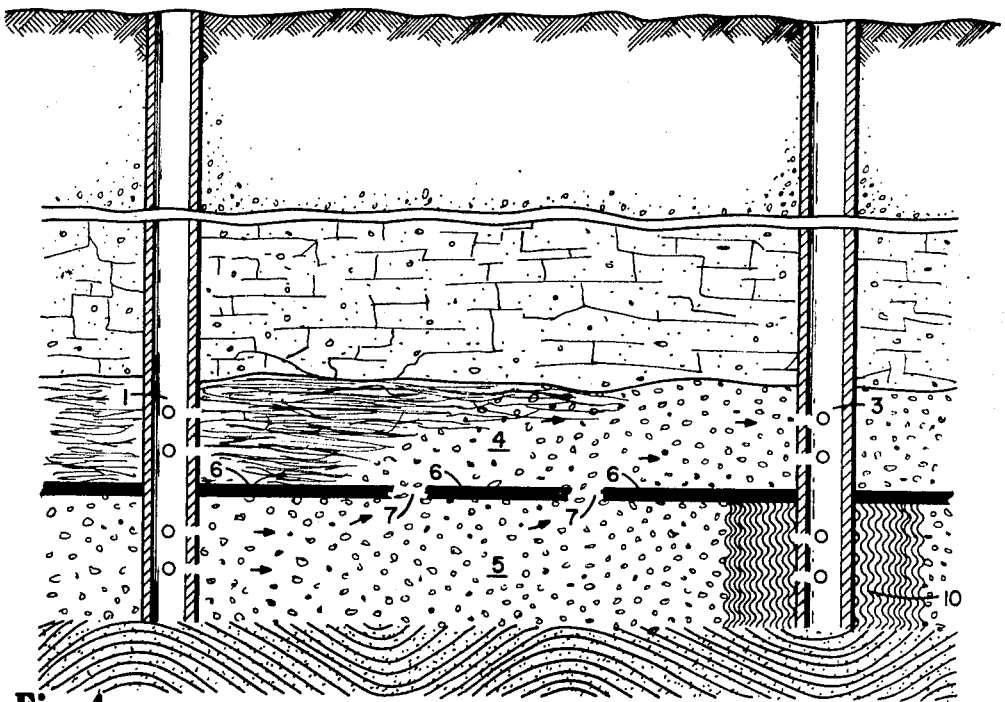

In FIG. 4, utilizing a reservoir identical with that shown in FIG. 1, the aqueous solution of the salts of Example I is injected into production well 2. The aqueous solution preferentially flows into more permeable zone 5 forming mass which is allowed to stand for approximately 48 hours during which precipitation occurs reducing the permeability of zone 10 well below that of oil-bearing zone 4.

Displacement water is now injected into the formation through injection well 1 and flows preferentially through more permeable zone 5 until water pressure builds up in zone 5. Thereafter, water pressure causes the flow of displacement water through holiday 7 into zone 4, displacing oil from zone 4 into production well 3.

Modifications of the Invention

It should be understood that the invention is capable of a variety of modifications and variations which will be made apparent to those skilled in the art by a reading of the specification.

What is claimed is:

1. In a process for the displacement of oil within a subterranean formation be the injection of displacement fluids into said formation, the improvement comprising injecting into at least a portion of the formation, an aqueous solution of compounds which precipitate over a pH dependent time period, forming a precipitate which reduces the permeability of the treated portion of said formation, wherein the aqueous solution comprises an isocyanuric acid or its derivatives.

2. The process of claim 1 wherein the aqueous solution comprises isocyanurate derivatives having the structure:

$$\left[ \begin{array}{c} \text{structure 1} \end{array} \right]_{M} \left[ \begin{array}{c} \text{structure 2} \end{array} \right]_{N} [-R-]_{2M+N+1} [A]_{M+2}$$

where
R = divalent radical
X = a metal e.g., Na, K, Li), hydrogen, quaternary ammonium or a combination thereof,
A = monovalent group selected from the following: isocyanate, urethane, urea, amino, $NH_2CO_2R'$,
R' = monovalent radical
M = average number of trisubstituted isocyanurate rings
N = average number of isocyanuric acid or derivative rings
2M + N + 1 = average number if divalent R groups
M + 2 = average number of A groups.

3. The process of claim 2 wherein the aqueous solution has a pH in the range of from about 8 to about 15.

4. The process according to claim 1 wherein at least a portion of said oil is displaced into a production well.

5. The process of claim 1 wherein the aqueous solution has a pH in the range of from about 8 to about 15.

6. In a process for the displacement of oil in subterranean formations which contain a more permeable zone and a less permeable oil-bearing zone both communicating with a well penetrating into said formation, the improvement comprising positioning within at least a portion of said more permeable zone, an aqueous solution of compounds which precipitate after a pH dependent time period to form a mass of precipitate within said more permeable zone, adjusting the pH of said aqueous solution to control the time of said precipitation, maintaining said solution within said more permeable zone for a time sufficient to cause substantial precipitation of said compounds to substantially reduce the permeability of said more permeable zone.

7. The process of claim 6 wherein a drive fluid is injected after the precipitation of said compound and wherein said mass of precipitate impedes the flow of said drive fluid through said more permeable zone.

8. The process of claim 6 wherein the aqueous solution comprises an isocyanuric acid or its derivatives.

9. The process of claim 6 wherein the aqueous solution comprises isocyanurate derivatives having the structure:

$$\left[ \begin{array}{c} \text{structure 1} \end{array} \right]_{M} \left[ \begin{array}{c} \text{structure 2} \end{array} \right]_{N} [-R-]_{2M+N+1} [A]_{M+2}$$

where
R = divalent radical
X = a metal, hydrogen, quaternary ammonium or a combination thereof,
A = monovalent group selected from the following: isocyanate, urethane, urea, amino, $NH_2CO_2R'$,
R' = monovalent radical
M = average number of trisubstituted isocyanurate rings
N = average number of isocyanuric acid or derivative rings
2M + N + 1 = average number of divalent R groups
M + 2 = average number of A groups.

* * * * *